United States Patent
Holy et al.

[11] Patent Number: 6,161,992
[45] Date of Patent: Dec. 19, 2000

[54] MACHINING SYSTEM WITH MOVABLE TOOL HEAD

[75] Inventors: Franz Holy, Stockerau; Karl Steiner, Vienna, both of Austria

[73] Assignee: Ernst Krause & Co., Vienna, Austria

[21] Appl. No.: 09/365,616

[22] Filed: Aug. 2, 1999

[30] Foreign Application Priority Data

Aug. 3, 1998 [AT] Austria ..................... 1341/98

[51] Int. Cl.⁷ .............................. B23C 9/00; B25J 11/00
[52] U.S. Cl. ..................... 409/134; 160/210; 160/223; 409/201; 409/211; 409/216; 29/DIG. 56
[58] Field of Search ................... 409/235, 201, 409/211, 216, 134, 183, 204; 901/23, 24, 48; 160/210, 211, 218, 223; 74/479.01; 29/39, DIG. 86, DIG. 56; 248/631, 654; 408/234, 236; 414/735

[56] References Cited

U.S. PATENT DOCUMENTS

| | | | |
|---|---|---|---|
| 5,401,128 | 3/1995 | Linden et al. | 409/201 X |
| 5,482,414 | 1/1996 | Hayashi et al. | 409/134 |
| 5,704,884 | 1/1998 | Vemura | 483/3 |
| 5,715,729 | 2/1998 | Toyama et al. | 409/235 X |
| 5,787,758 | 8/1998 | Sheldon | 409/201 X |
| 5,893,690 | 4/1999 | Haninger | 409/134 |

FOREIGN PATENT DOCUMENTS

| | | |
|---|---|---|
| 0673712 | 9/1995 | European Pat. Off. . |
| 0836909 | 4/1998 | European Pat. Off. . |
| 3620765 | 12/1987 | Germany . |
| 4405247 | 8/1995 | Germany . |
| 295107 | 12/1988 | Japan ................... 409/134 |
| WO 97/22832 | 6/1997 | WIPO . |

Primary Examiner—William Briggs
Attorney, Agent, or Firm—Herbert Dubno

[57] ABSTRACT

A machining system has a frame forming a working station and a mounting plate movable relative to the frame in and adjacent the station in a first main direction, in a second direction transverse to the main direction, and in a third direction transverse to the first and second directions. A machine tool head is mounted on the mounting plate and a plurality of struts have outer ends swiveled on the mounting plate and extending inward away from the plate. A mechanism acting on the struts moves the plate and tool head in the three directions. A main panel is movable only in the first and second directions and the head is mounted in the panel for movement relative thereto only in the third direction. In addition a pair of side panels of changeable length each have an inner edge connected along a respective inner axis parallel to the third direction to a respective outer edge of the main panel and a respective outer edge connected at a respective outer axis parallel to the third direction on the frame.

10 Claims, 8 Drawing Sheets

MACHINING SYSTEM WITH MOVABLE TOOL HEAD

FIELD OF THE INVENTION

The present invention relates to a machining system. More particularly this invention concerns a machining system having a working or tool head that moves in three dimensions.

BACKGROUND OF THE INVENTION

A standard three-dimensional machining tool, such as one that mills castings or bores a series of holes in a workpiece, typically has a head carried on a mounting plate. The head holds the actual tool which can be a drill bit, milling cutter, grinding wheel, or the like. The mounting plate is moved in three dimensions by a mechanism typically having at least three legs each with an inner end attached to the mounting plate. Many such machines actually use a hexapod or six-leg system where relatively angled pairs of legs extending at an acute angle to each other are used to stiffen the assembly. In such a hexapod system the outer ends of the struts lie on points of a hexagon whereas the inner ends are paired closely flanking points of a triangle or vice versa. The work head itself typically has a hydraulic motor connected via flexible hoses to a pressure source and sump.

There are two main types of such machines. The first type uses legs of variable length. In a typical system each leg is formed as a threaded spindle with a head seated rotatably in an outer socket joint by which it is joined to the mounting plate and an inner end seated in another such socket joint that is formed as a nut. Rotation of these spindles by respective servomotors changes their effective lengths between the respective swivel joints, allowing the mounting plate to be tilted at virtually any angle and to advance the tool along any path or axis. The actual operation of the servomotors is through a computer that is inputted the desired movement of the tool and that calculates the strut extensions and/or shortenings needed to produce this movement.

In a typical such machine the outer strut ends are above the inner ends and the tool carried by the work head attacks the workpiece primarily from above. The workpiece, e.g. a block to receive a pattern of drilled and threaded holes or a statue to be milled or burnished, is clamped in a predetermined position and thereafter the head is moved along its path to perform the desired machining operation, normally a material-removing one.

A large bellows-type cuff serves to protect the heavily lubricated and finely fitted strut mechanism used to displace the tool head from the chips and grit that may be produced by the machining operation. This cuff has its large rear end clamped around the upper ends of the struts and its smaller front end clamped around the lower ends of the struts at the mounting plate.

With each work cycle this cuff is stretched and deformed. Since the machine is normally used in a high-end production operation, it will therefore often follow the exact same sequence of motions hundreds of times, flexing and folding the cuff in exactly the same places every time. The result is rapid failure of this expensive and difficult-to-install part. In fact the service life of the best such cuff is much less than the mean time between succeeding lubrications or servicings for the mechanism it is protecting.

In the second main type of so-called horizontal machine the mounting plate moves predominantly horizontally at the mouth or outer end of a hexagonal-section horizontal tunnel. Each tunnel wall has a respective horizontally displaceable slide carrying an outer or rear swivel joint to which is attached the rear swivel end of a respective strut whose front end is similarly attached via a front swivel to the back of the mounting plate. The struts run at a modest angle to the horizontal, all lying on an imaginary frustocone. Respective servoactuators displace the slides and strut rear ends horizontally to move the mounting plate and the tool it carries.

With such a system the software and actuators must take into account the weight of the head and tool, which can change depending on machining operation, along with the desired movement. This considerably complicates the operation of the machine since for instance when the tool is fully extended lever action puts a greater strain on some of the servomotors than when it is retracted.

In such a machine there is typically no cover or protection for the strut mechanism. Thus it is exposed to whatever dust or grit might be raised by the machining operation it is conducting.

OBJECTS OF THE INVENTION

It is therefore an object of the present invention to provide an improved such machining system.

Another object is the provision of such an improved machining system which overcomes the above-given disadvantages, that is which has a long service life because its delicate parts are well protected from the machining operation and where, when used horizontal, the weight of the tool head is compensated for.

SUMMARY OF THE INVENTION

A machining system according to the invention has a frame forming a working station and a mounting plate movable relative to the frame in and adjacent the station in a first main direction, in a second direction transverse to the main direction, and in a third direction transverse to the first and second directions. A machine tool head is mounted on the mounting plate and a plurality of struts have outer ends swiveled on the mounting plate and extending inward away from the plate. A mechanism acting on the struts moves the plate and tool head in the three directions. A main panel is movable only in the first and second directions and the head is mounted in the panel for movement relative thereto only in the third direction. In addition a pair of side panels of changeable length each have an inner edge connected along a respective inner axis parallel to the third direction to a respective outer edge of the main panel and a respective outer edge connected at a respective outer axis parallel to the third direction on the frame.

Thus with this system the mechanism that moves the tool head is completely walled off from the work station by the panels of the cover. The tool head can still move freely in three directions, with the cover accommodating this movement. Thus the struts can be shifted or lengthened and shortened while being perfectly protected. Even when the tool head has been advanced to the far end of the work station, the positioning struts remain shrouded and protected. The high temperatures created in the work station, for instance when the tool is a welder or hot gluer, do not get to the strut mechanism, nor does any of the grit and dust generated by a material-removing machining operation, for instance of soft metals like magnesium or aluminum.

Each side panel can be basically L-shaped and include a first subpanel of a length variable in the second direction and lying generally in a plane parallel to the second direction and a second subpanel displaceable in the first direction, extending in a plane generally parallel to the first direction, and connected to the respective first subpanel. The front end of such a cover is therefore basically planar and perpendicular to the first direction.

In another system according to the invention each of the side panels is generally planar and each inner edge is pivoted at the inner axis on the respective main-panel outer edge and each outer edge is pivoted at the respective outer axis on the frame. The side panels can be pleated and corrugated or can each be formed by a respective deck of stiff cards so as to follow movement of the tool head without significant wear or resistance.

The directions are all orthogonal to each other and the head is displaceable between a retracted position at an outer edge of the working station and an advanced position projecting well into the working station. The means mounting the head includes means for transmitting movement in the first direction from the head to the main panel and thence to the inner edges of the side panels. Thus the panels are displaced by the head.

The first direction can be horizontal in which case the system further has according to the invention at least one vertically extensible actuator braced between the frame and the mounting plate and slidable in the first direction on the frame so that the actuator can expand to cancel out the weight of the plate and the parts carried by it. This actuator is set to cancel out the weight of the head and any structure carried by it, so the strut mechanism serves purely to position and displace the head, not to support it. In this system one of the side walls carries a pair of support arms flanking the mounting head and each carrying a respective such actuator so that each actuator bears via the respective support arm on the frame. In addition here the mounting plate has a pair of support lugs flanking the head and above the support arms and each actuator is vertically braced between a respective such support lug and the respective support arm.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
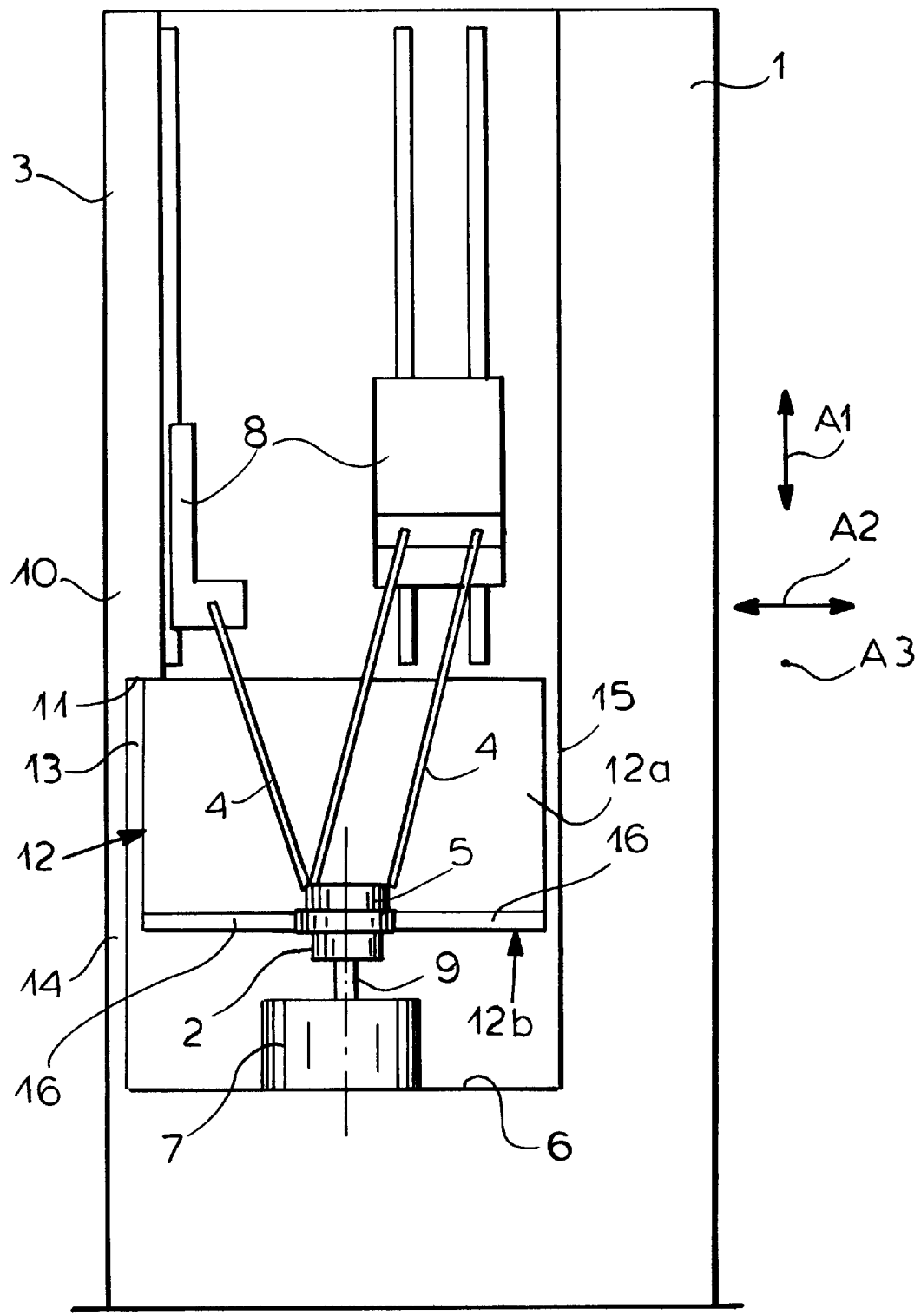
FIGS. 1 and 2 are schematic side views of vertically and horizontally acting machining systems according to the invention.
Figure 2:
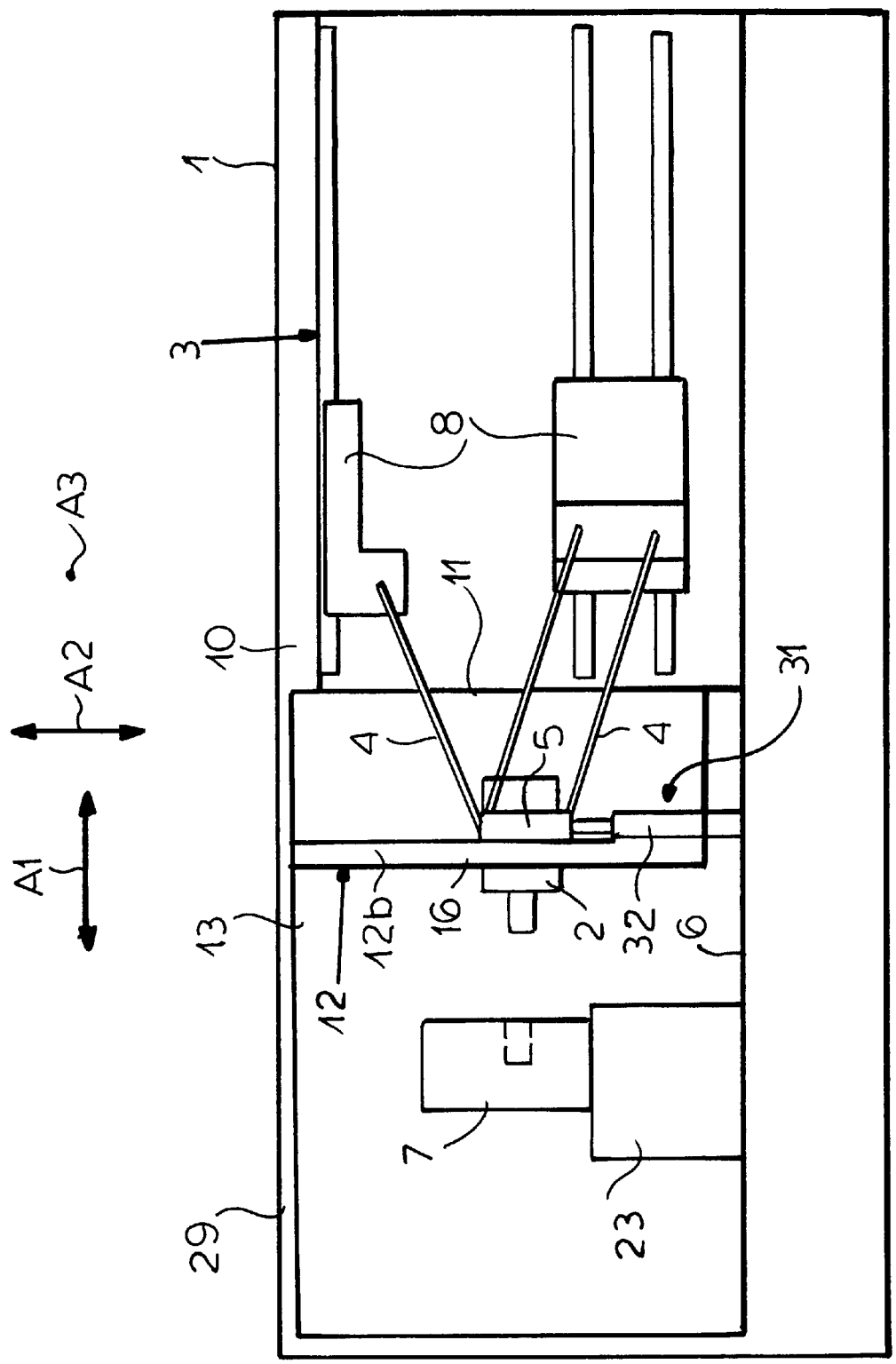
Figure 3:
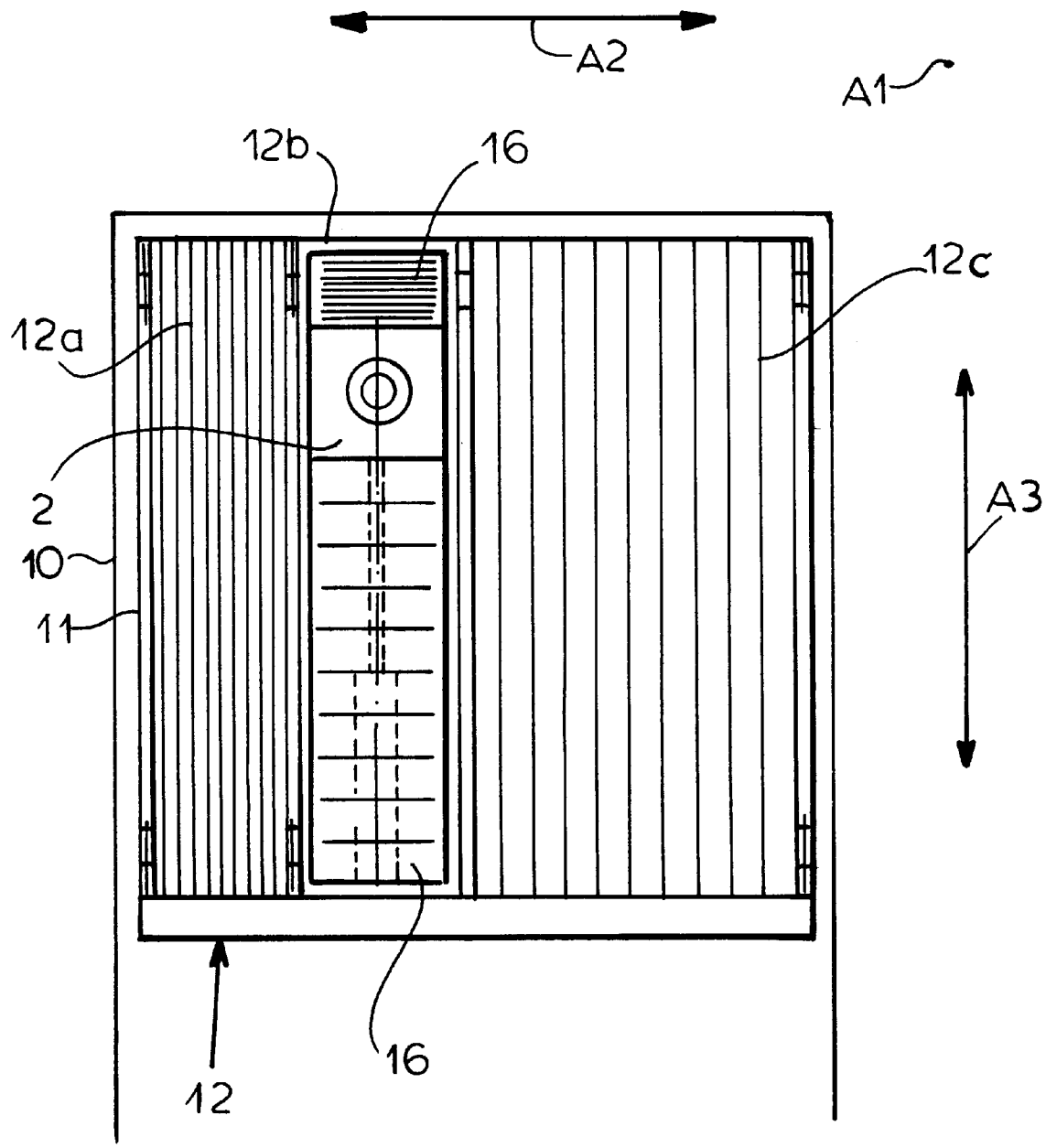
FIG. 3 is an end view of the cover of the system of this invention.

As seen in FIGS. 1, 2, and 3 a machine frame 1 carries a tool head 2 by means of a positioning mechanism 3 including three pairs of struts 4 having front ends mounted via respective swivels at three main locations on a plate 5 carrying the tool head 5 and rear ends connected via swivels on respective actuator slides 8 displaceable in a first or main direction A1 on the frame 1. Each pair of struts 4 has both its front ends attached very close to each other on the plate 5 and its rear ends attached to respective different slides 8 that are normally set on the corners of a triangle. Thus the plate 5 and the head 2 carried by it can be moved by the mechanism 3 in the main direction A1 lying in the plane of the view in FIGS. 1 and 2, in a perpendicular direction A2 lying in the view plane of FIGS. 1, 2, and 3, and in a third direction A3 perpendicular to directions A1 and A2 and to the view plane of FIGS. 1 and 2.

The frame 1 defines a rear portion 10 in which the mechanism 3 is at least partially contained and a front working portion or station 13 in which the tool head 2 is movable forward of a front edge 11 of the portion 10. When the tool head 2 is retracted it is located at the edge 11 between the portions 10 and 13, but it can be extended well into the station 13 with the struts 4 extending well into this station 13.

In FIG. 1 the main direction A1 is vertical and the frame 1 defines the working station 13 between vertical side walls 14 and 15. A workpiece 7 is fitted to a floor 6 of the station 13 and the head 2 holds a drill bit 9 used to bore holes in it.

The system of FIG. 2 has the direction A1 horizontal and the workpiece 7 held atop a vise block 23 below a top wall 29 or roof of the station 13.

According to the invention the head 2 as also shown in FIG. 3 is fitted in a center or main panel 12b of a cover or shield 12 having side panels 12a and 12c. The side panels 12a and 12c are basically planar and of freely changeable length, with outer edges pivoted on axes parallel to the direction A3 on the frame 1 at the edge 11 and inner edges pivoted or hinged on axes also parallel to the direction A3 on outer edges of the main panel 12b. Furthermore side sections 16 of the main panel 12b allow the head 2 to move along guide rails formed by the panel 12b with the plate 5 in the direction A2 relative to the main panel 12b. The length-changeable panels 12a may be of flexible zig-zag or corrugated shape as shown in FIGS. 4 and 5, or may be formed of relatively slidable decks of plates as shown in FIGS. 6 and 7.

Figure 4:
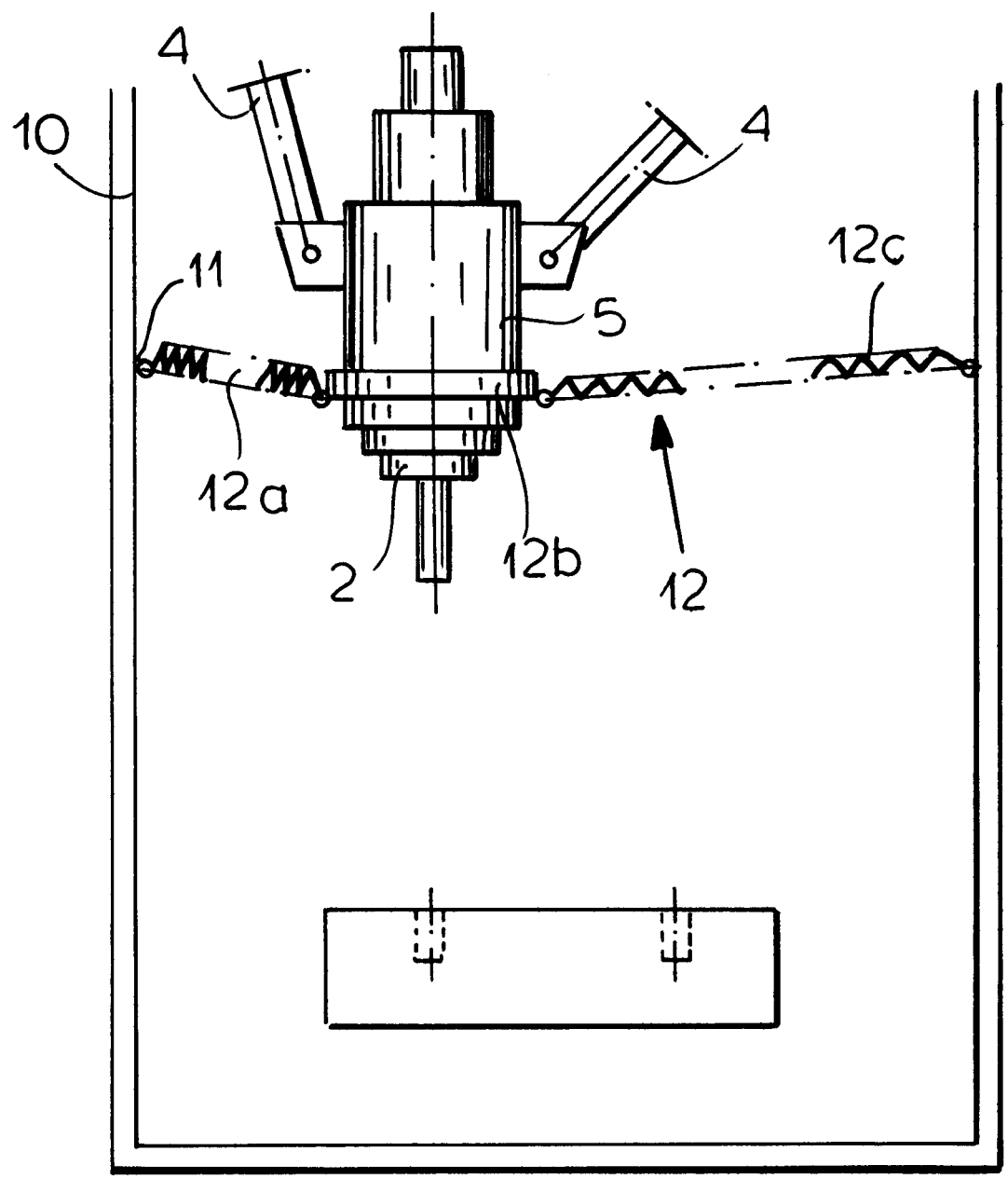
FIGS. 4 and 5 are detail sectional views through an embodiment of the cover in the retracted and extended positions of the tool head.
Figure 5:
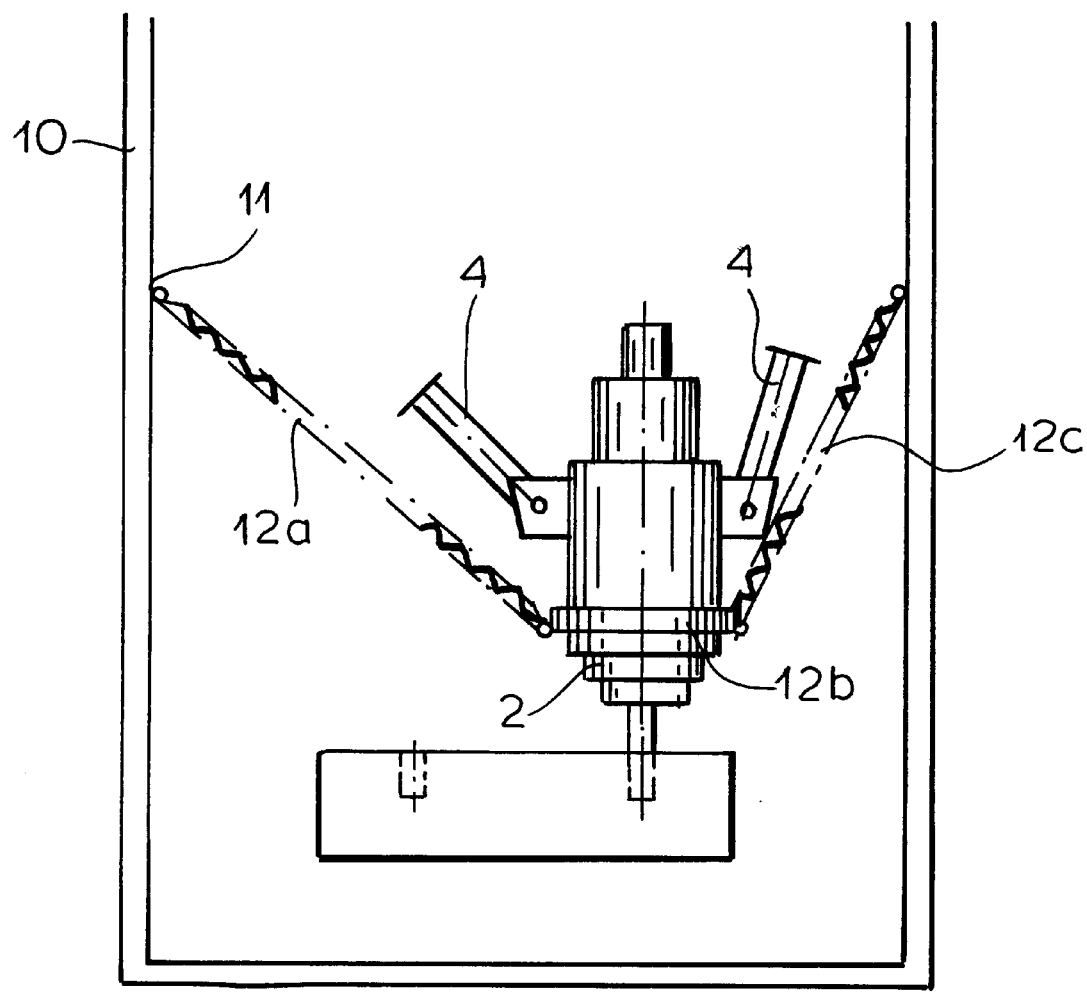
Figure 6:
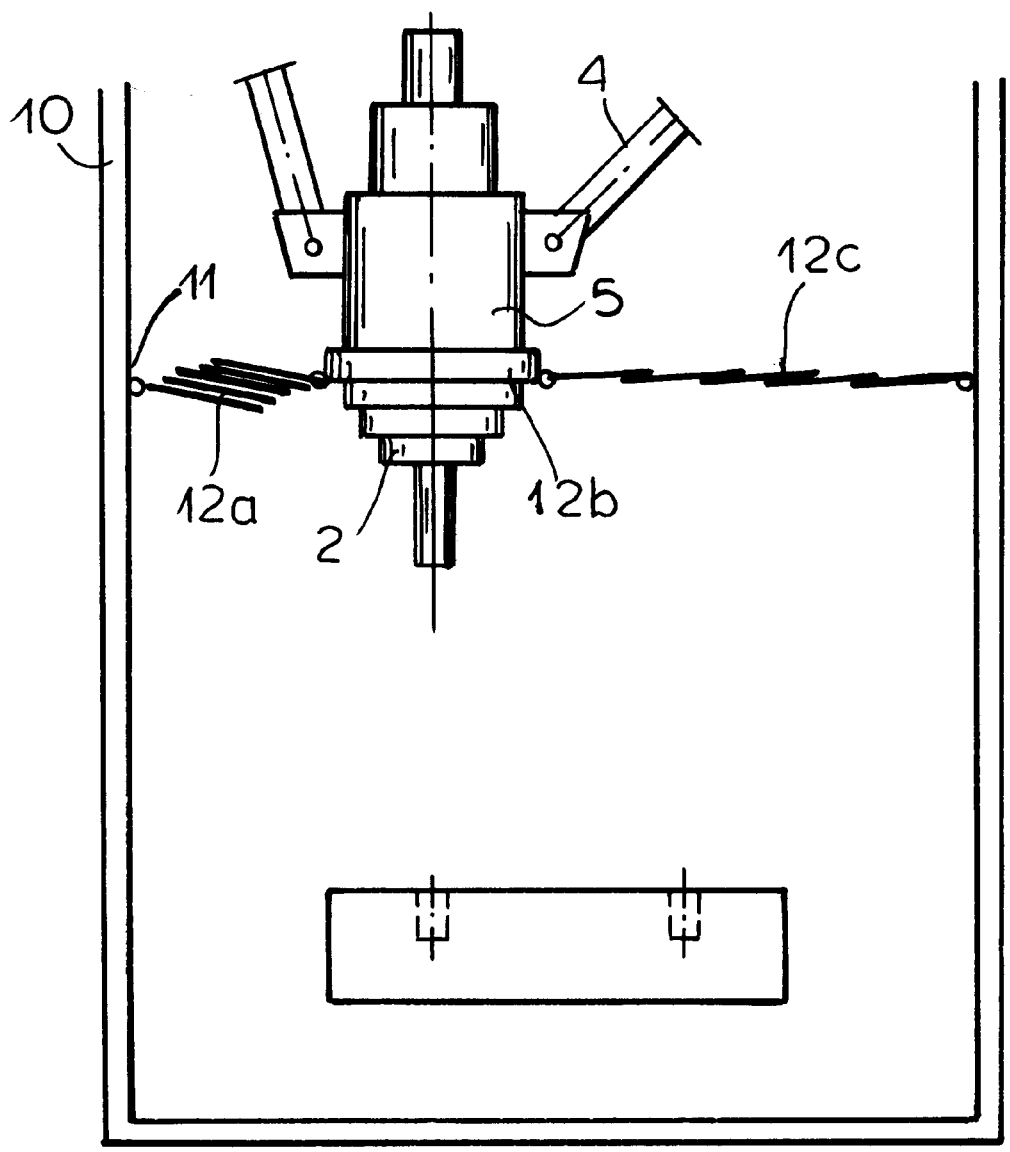
FIGS. 6 and 7 are detail sectional views through another embodiment of the cover in the retracted and extended positions.
Figure 7:
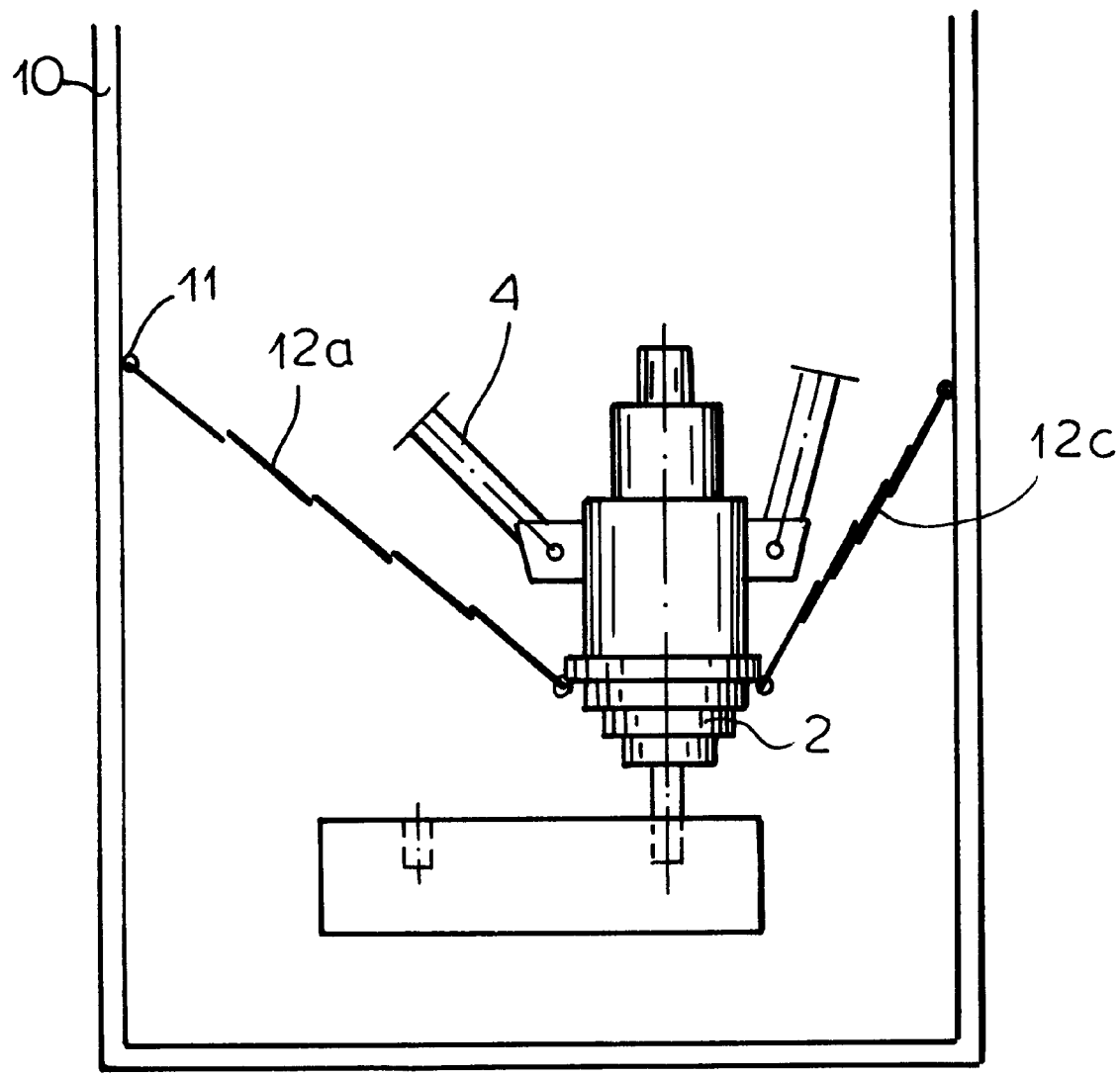

As a result when the head 2 is retracted all the way back as shown in FIGS. 4 and 6, the panels 12a to 12c are all generally coplanar and lying at the front edge 11, with perhaps one of the panel 12a or 12c being more compressed than the other as shown. When extended as shown in FIGS. 5 and 7, the side panels 12a and 12c are more or less extended and lie in respective planes parallel to none of the directions A1 to A3. Of course as the head 2 moves from side to side in the main panel 12b, the side sections 16 similarly compress and expand as illustrated by FIG. 3.

FIG. 2 also shows a weight-compensating system 31 including a pair of hydraulic cylinders 32 extending in the direction A2 and having upper ends connected to the mounting plate 5 and lower ends sliding in the direction A1 on the floor 6. These cylinders 32 are spaced apart in the direction A3 and are pressurized to exactly cancel out the weight of the mounting plate 5 and tool head 2 and cover 12 carried by it, making the head 2 in effect float. Thus the unillustrated computer controller connected via respective servomotors, for instance via rack and pinion gear trains, to the slides 8 does not have to allow for the weight of these parts when it positions and moves the head 2.

Figure 8:
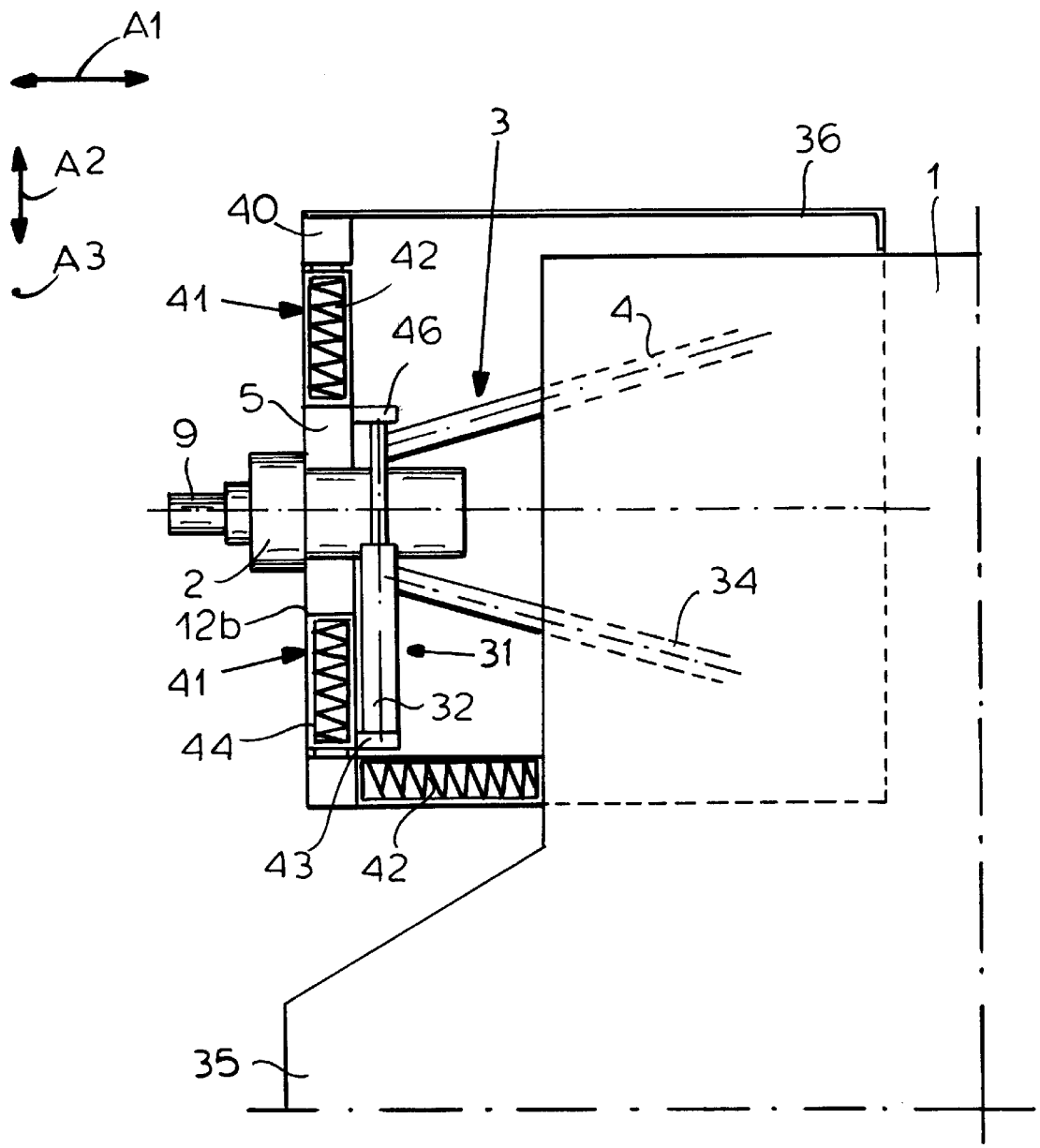
FIG. 8 is a partial vertical section through an other cover system in accordance with the invention.

FIG. 8 shows another horizontally acting machining head 2. Here, however, instead of planar side panels 12a and 12c, it has L-shaped side panels 41 comprising subpanels 41 extending and length-changeable in the direction A2 and subpanels 42 extending in the direction A1 and joined to the subpanels 44 at a front frame 40. The panels 40 and 44 and 42 together form a box-like housing 36 that can move in the direction A1 as a unit. Of course the head 2 can move in the direction A3 perpendicular to the view plane of FIG. 8 in the main panel 12b as before. The housing 36 and all the subpanels 41 and 42 move with the head in the direction 2, but the subpanels 41 can change length to permit movement in the direction A2 while there are side section 16 in the main panel 12b to permit the head 2 to move in the direction A3. Here the housing 36 carries on the lower side subpanel 42 two support arms 43 carrying the cylinders 31 whose upper ends are attached to lugs 46 on the plate 5 to cancel out the weight of the structure hanging on the plate 5.

We claim:

1. In a machining system comprising:
   a frame forming a working station;
   a mounting plate movable relative to the frame in and adjacent the station in a first main direction, in a second direction transverse to the main direction, and in a third direction transverse to the first and second directions;
   a machine tool head mounted on the mounting plate;
   a plurality of struts having outer ends swiveled on the mounting plate and extending inward away from the plate; and
   mechanism acting on the struts to move the plate and tool head in the three directions,
   the improvement comprising:
   a main panel having outer edges movable only in the first and second directions;
   means mounting the head in the panel between the edges thereof for movement relative thereto only in the third direction;
   a pair of side panels of changeable length each having an inner edge connected along a respective inner axis parallel to the third direction to a respective one of the outer edges of the main panel and a respective outer edge connected at a respective outer axis parallel to the third direction on the frame.

2. The improved machining system defined in claim 1 wherein each side panel is basically L-shaped and includes a first subpanel of a length variable in the second direction and lying generally in a plane parallel to the second direction and a second subpanel displaceable in the first direction, extending in a plane generally parallel to the first direction, and connected to the respective first subpanel.

3. The improved machining system defined in claim 1 wherein each of the side panels is generally planar and each inner edge is pivoted at the inner axis on the respective main-panel outer edge and each outer edge is pivoted at the respective outer axis on the frame.

4. The improved machining system defined in claim 3 wherein each side panel is pleated and corrugated.

5. The improved machining system defined in claim 3 wherein each side panel is formed by a respective deck of stiff cards.

6. The improved machining system defined in claim 1 wherein the directions are all orthogonal to each other and the head is displaceable between a retracted position at an outer edge of the working station and an advanced position projecting well into the working station.

7. The improved machining system defined in claim 1 wherein the means mounting the head includes means for transmitting movement in the first direction from the head to the main panel and thence to the inner edges of the side panels.

8. The improved machining system defined in claim 1 wherein the first direction is horizontal, the system further comprising
   at least one vertically extensible actuator braced between the frame and the mounting plate and slidable in the first direction on the frame, whereby the actuator can expand to cancel out the weight of the plate and the parts carried by it.

9. The improved machining system defined in claim 8 wherein one of the side walls carries a pair of support arms flanking the mounting head and each carrying a respective such actuator, whereby each actuator bears via the respective support arm on the frame.

10. The improved machining system defined in claim 9 wherein the mounting plate has a pair of support lugs flanking the head and above the support arms, each actuator being vertically braced between a respective such support lug and the respective support arm.

* * * * *